No. 633,177. Patented Sept. 19, 1899.
C. WORTHINGTON.
SEAT SUPPORT FOR VELOCIPEDES.
(Application filed Aug. 18, 1898.)
(No Model.)
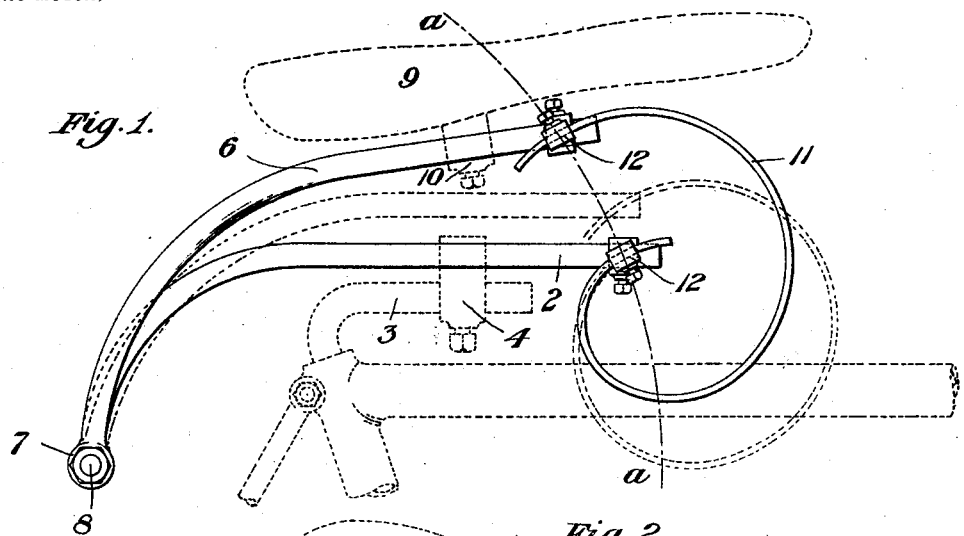
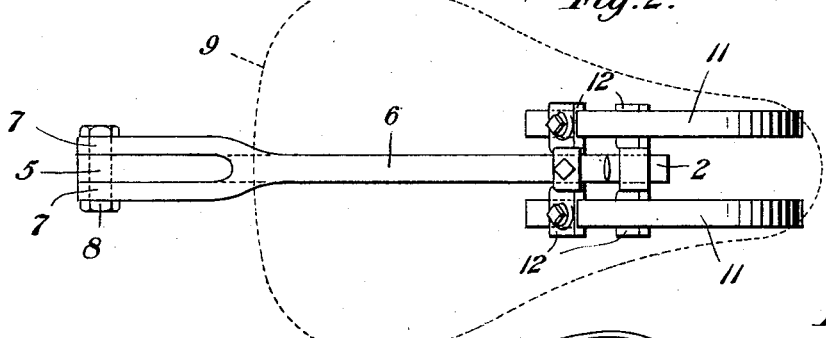
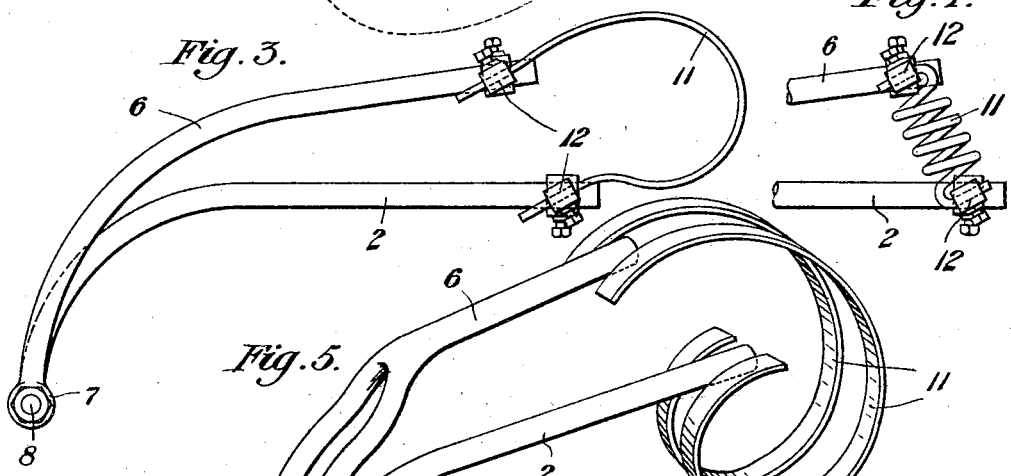
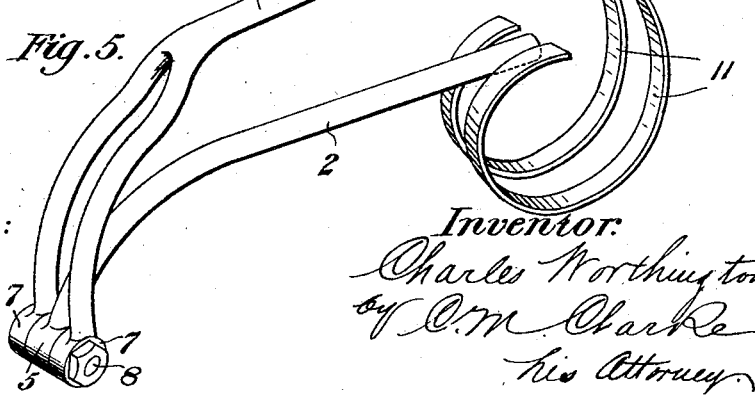
Witnesses:
Watson Large.
R. J. Edwards
Inventor:
Charles Worthington
by O. M. Clarke
his Attorney

UNITED STATES PATENT OFFICE.

CHARLES WORTHINGTON, OF PITTSBURG, PENNSYLVANIA.

SEAT-SUPPORT FOR VELOCIPEDES.

SPECIFICATION forming part of Letters Patent No. 633,177, dated September 19, 1899.

Application filed August 18, 1898. Serial No. 688,852. (No model.)

*To all whom it may concern:*

Be it known that I, CHARLES WORTHINGTON, a citizen of the United States, residing at Pittsburg, in the county of Allegheny and State of Pennsylvania, have invented or discovered a new and useful Improvement in Seat-Supports for Velocipedes, of which the following is a full, clear, and exact description, reference being had to the accompanying drawings, forming part of this specification, in which—

Figure 1 is a view in side elevation of my improved seat-support, the lowered position being indicated by dotted lines. Fig. 2 is a plan view. Figs. 3 and 4 are detail views, in side elevation, illustrating the application of modified forms of spring. Fig. 5 is a perspective view of the main operative parts detached.

My invention relates to supporting mechanism for velocipede-seats, and has for its object the construction of a support which will admit of considerable movement of the seat in a simultaneous forward and downward direction and corresponding return movement under action of retracting-springs.

In the saddle equipment of velocipedes it is desirable to provide a seat-support which will readily absorb the shock occasioned by obstacles or impediments in the road and at the same time yield sufficiently in a forward direction to overcome the momentum of the rider, enabling him to more securely retain his seat with greater comfort when riding over rough roads. To this end I have devised a support consisting of a rigid member, a movable member pivoted thereto, and intervening springs, as I shall now proceed to describe.

Referring to the drawings, 2 is the rigid member, which may consist of a round bar or other suitable form or shape in cross-section adapted to be secured to the post 3 of a velocipede by the usual or any suitable kind of clip 4, upon which it is adjustable in any desired direction. At the back end the bar 2 is turned down abruptly, terminating in a pivotal bearing 5 at a considerable proportionate distance below the center of the bar in order to locate such pivotal bearing below and behind the seat, thus securing its movement in the desired direction, and a special advantage of this constrction is that by thus bending down the rear end of the lower bar and pivoting it at that point to the bent-down lower end of the upper bar the two bars are thus brought nearer together, and I am thus enabled to utilize a very limited range of spring. When thus constructed, it will be seen that when under compression the two bars are brought very close together, giving a compact construction and permitting a spring of considerable resiliency to be used.

The upper movable seat-supporting member 6 consists of a single or double bar or plate of any suitable construction, preferably straight at its forward end, turned downwardly at the back, and formed into pivotal bearings 7, which are connected with the bearing 5 of member 2 by a bolt or rivet 8. Upon the member 6 a saddle 9 of any suitable form may be secured, as by clip 10, so as to be adjustable to position. It will be seen that when so connected the upper member will be capable of a swinging movement on the pivotal bearing 8, with relation to the member 2, in a forward and downward direction, the direction of the arc of movement being indicated by the line *a a*, which constitutes a mean between the horizontal force of momentum and the vertical force of gravity.

Interposed between the rigid member 2 and yielding member 6 is a spring or springs 11, of any desired form of construction, or their resilient equivalent—as, for instance, a device employing compressed air so arranged and connected to the members by suitable devices, as clips 12 12, as to bring the fixed and yielding extremities of the springs approximately within range of the arc *a a*, thereby interposing direct elastic resistance to the weight of the rider when exerted in the same direction under the conditions of use already described.

It will be understood that the design and construction of the seat-support and its parts may be varied, and changes and modifications may be made in the proportions or other details by the skilled mechanic, without departing from my invention, since I do not desire to be limited to the construction shown and described, but to include within the scope of the present invention all such modifications as would be considered equivalents thereof.

Having described my invention, what I claim, and desire to secure by Letters Patent, is—

1. A seat-support for velocipedes consisting of a stationary member having a downward and rearward extension and adapted to be secured to the frame of a velocipede, a movable member also having a downward and rearward extension pivotally connected with the rigid member at a point below and behind its main body portion, and an interposed spring secured to each member, substantially as set forth.

2. A seat-support for velocipedes consisting of a stationary longitudinal supporting-member having a downward and rearward extension terminating in a pivotal extremity below and behind its main body portion, a movable member having a similarly-shaped extension pivotally secured to the rigid member, its free end projecting forwardly over the rigid member, and a resilient member secured to the stationary member and movable member respectively, substantially as set forth.

In testimony whereof I have hereunto set my hand.

CHARLES WORTHINGTON.

Witnesses:
PETER J. EDWARDS,
C. M. CLARKE.